(12) United States Patent
van Baarsen et al.

(10) Patent No.: US 7,747,097 B2
(45) Date of Patent: Jun. 29, 2010

(54) METHOD FOR SIMPLE HARDWARE IMPLEMENTATION OF JPEG SIZE LIMITER

(75) Inventors: John Peter van Baarsen, Delta (CA); Yun Shon Low, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 1048 days.

(21) Appl. No.: 11/424,686

(22) Filed: Jun. 16, 2006

(65) Prior Publication Data
US 2007/0294245 A1 Dec. 20, 2007

(51) Int. Cl.
*G06K 9/36* (2006.01)
(52) U.S. Cl. ..................................... 382/248
(58) Field of Classification Search ......... 382/232–233, 382/236–251; 341/50; 358/426.1–426.14; 348/384.1, 387.1, 406.1, 420.1–421.1, 430.1; 375/240.01–240.24
See application file for complete search history.

(56) References Cited

U.S. PATENT DOCUMENTS

| | | | |
|---|---|---|---|
| 5,937,100 A | 8/1999 | Kitajima | |
| 5,949,911 A * | 9/1999 | Chui et al. | 382/240 |
| 6,125,201 A * | 9/2000 | Zador | 382/166 |
| 6,233,359 B1 * | 5/2001 | Ratnakar et al. | 382/250 |
| 6,263,106 B1 | 7/2001 | Yamagata | |
| 6,424,739 B1 | 7/2002 | Ukita et al. | |
| 6,463,177 B1 | 10/2002 | Li et al. | |
| 6,795,581 B1 | 9/2004 | Nomura | |
| 6,822,587 B2 | 11/2004 | Henry | |
| 7,463,775 B1 * | 12/2008 | Sites | 382/232 |
| 2002/0191104 A1 | 12/2002 | Matsutani et al. | |
| 2003/0072492 A1 | 4/2003 | Sugimura et al. | |
| 2003/0081845 A1 | 5/2003 | Mukherjee et al. | |
| 2004/0126019 A1 | 7/2004 | Ikebe et al. | |
| 2004/0136595 A1 | 7/2004 | Sakuyama et al. | |
| 2004/0184665 A1 | 9/2004 | Guillou et al. | |
| 2004/0190784 A1 | 9/2004 | Ozawa et al. | |
| 2004/0208381 A1 | 10/2004 | Clark | |
| 2005/0175251 A1 | 8/2005 | Taketa et al. | |
| 2005/0275666 A1 | 12/2005 | Nagarajan | |

FOREIGN PATENT DOCUMENTS

| | | |
|---|---|---|
| EP | 1111904 | 6/2001 |
| EP | 0888010 B1 | 10/2004 |
| JP | 2004248267 | 9/2004 |

\* cited by examiner

OTHER PUBLICATIONS

Etchells and Barnett, "Nikon D50 Digital Camera Review: Features Overview", http://www.imaging-resource.com/PRODS/D50/D50A5.HTM, Jan. 9, 2006, (pp. 1-4).

*Primary Examiner*—Jose L Couso

(57) ABSTRACT

A size limiter module used to limit a file size of an encoded file is disclosed. The size limiter module includes a size limiter set-up calculator and a size limiter processing engine. The size limiter calculator is configured to identify a maximum bit size for a set of data to be encoded based on a maximum value for the file size of the encoded file. The size limiter processing engine is configured to be in communication with the size limiter set-up calculator to process the set of data to be encoded and to monitor a cumulative bit size for the set of data according to an order. When the cumulative bit size is greater than a maximum bit size, the size limiter processing engine inserts end of block data into the set of data. The end of block data signals the substitution of a null value for all data units subsequent to the end of block data.

21 Claims, 7 Drawing Sheets

METHOD FOR SIMPLE HARDWARE IMPLEMENTATION OF JPEG SIZE LIMITER

BACKGROUND

The popularity of handheld electronic devices with camera capability (e.g., cell phones, digital cameras, etc.) has spawned numerous applications. Memory capacity is often very limited for these handheld devices so the images are typically compressed into either a lossless or a lossy compression format when stored. Lossless compression formats allow the exact original image to be reconstructed from the compressed image data. Examples of lossless formats include Graphics Interchange Format (GIF), Portable Network Graphics (PNG), and Tagged Image File Format (TIFF). Lossy compression formats compresses in a manner that allows a close but not exact rendition of the original image to be reconstructed from the compressed image data. An example of a lossy compression format is the Joint Photographic Experts Group (JPEG) format. Generally, lossy compression formats result in much smaller image data files than lossless compression formats. As a result, in certain applications where memory space is very restricted (i.e., handheld device), JPEG compression is the compression format of choice.

One inherent limitation that is common to all conventional JPEG compression methods is that there is no deterministic manner in which to ensure that maximum size limits for the compressed JPEG files are not exceeded. This is a particularly serious drawback for compression of highly complex images which tends to result in correspondingly large JPEG image files. The larger the JPEG image files the less number of images that the device can store, which adversely impacts the utility of a camera function on a handheld device with limited memory capacity.

In view of the forgoing, there is a need for a method, apparatus, and system to set and enforce maximum size limits for a JPEG file without unacceptably impacting the quality of the resulting image.

SUMMARY

Broadly speaking, the present invention fills these needs by providing improved apparatuses, methods, and systems for setting and enforcing maximum size limits for a JPEG file without unacceptably impacting the quality of the resulting image. It should be appreciated that the present invention can be implemented in numerous ways, including as an apparatus, a method and a system. Several inventive embodiments of the present invention are described below.

In one embodiment of the present invention a method for limiting a file size of an encoded file is disclosed. A maximum bit size limit for the encoded file is set and a data set is received from the encoded file. Successive bit data sizes corresponding to each data unit of the data set are accumulated according to an order. End of block data is inserted into the data set once it is detected that the data set has reached an accumulated monitored bit size that exceeds the maximum bit size limit. The end of block data demarcates the portion of the data set that exceeds the maximum bit size limit. A value is assigned to all the data units of the portion of the data set that exceeds the maximum bit size limit.

In another embodiment, a mobile graphics engine (MGE) used to limit a file size of an encoded file is disclosed. The MGE has a sub-sampling component and a core component. The sub-sampling component includes a resizer module and a converter module. The resizer module is configured to be in communications with the converter module and a digital input module. The converter module is configured to be in communications with a display memory. The MGE further includes a core component that is configured to be in communications with the resizer module, the display memory, a file memory buffer, and a host computing device. Incorporated within the core component is a size limiter module that is configured to limit the file size of an encoded file based on a limit value applied to each data set of the encoded file.

In still another embodiment, a size limiter module configured to limit a file size of an encoded file is disclosed. The size limiter module includes a size limiter set-up calculator and a size limiter processing engine. The size limiter calculator is configured to identify a maximum bit size for a set of data to be encoded from the encoded file based on a maximum value for the file size of the encoded file. The size limiter processing engine is configured to be in communication with the size limiter set-up calculator, process the set of data to be encoded, and monitor a cumulative bit size for the set of data according to an order. When the cumulative bit size of the set of data is greater than a maximum bit size identified for the set of data, the size limiter processing engine inserts end of block data into the set of data. The end of block data signals the size limiter processing engine to substitute a null value for all data units positioned after the end of block data.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for apparatuses, methods, and systems for setting and enforcing maximum size limits for a JPEG file without unacceptably impacting the quality of the resulting image. It will be obvious, however, to one skilled in the art, that the present invention may be practiced without some or all of these specific details. In other instances, well known process operations have not been described in detail in order not to unnecessarily obscure the present invention.

The embodiments described herein provide a method, apparatus and system to apply a maximum size limit for Joint Photographic Experts Group (JPEG) format files created from images captured through a digital camera, camcorder, cell phone with camera capability, etc., and that may be displayed on a display panel integrated into the image capturing device, an external display panel (i.e., a display panel other than the display panel integrated into the device capturing the image), or rendered on a physical medium such as paper, polymers, or other suitable physical media. For example, an image captured through a digital camera, camcorder, cell phone, etc., may be displayed on a liquid crystal display (LCD) integrated with the image capturing device, a computer/television display panel (linked to the image capturing device), photographic paper, printer paper, plastic sheets, etc. The embodiments described below will ensure that during JPEG compression of the captured image, the resulting JPEG file does not exceed a maximum size limit set by a user without adversely impacting the image quality to an unacceptable degree.

Figure 1:
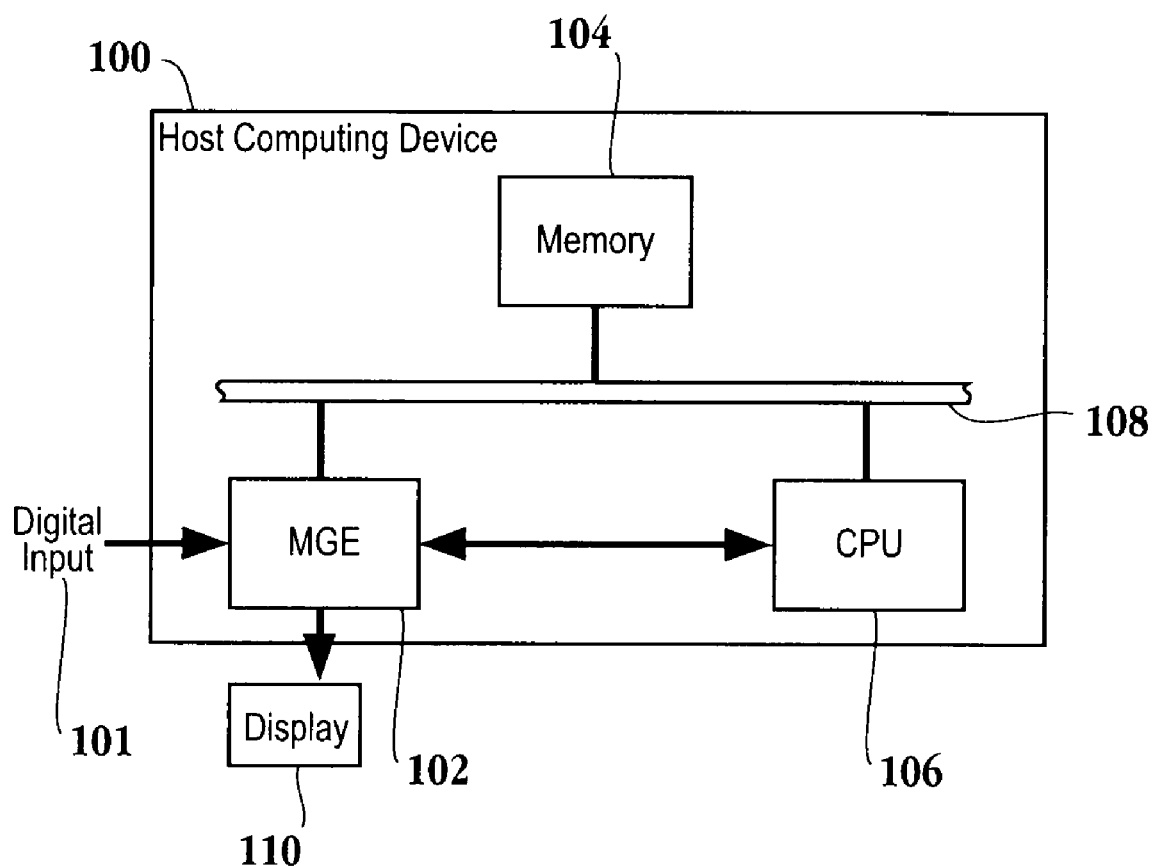
FIG. 1 is a high level simplified schematic diagram of the functional elements of a typical device used to capture, process, and store digital images, in accordance with one embodiment of the present invention.

FIG. 1 is a high level simplified schematic diagram of the functional elements of a typical device used to capture, process, and store digital images, in accordance with one embodiment of the present invention. In this embodiment, the host computing device 100 includes a mobile graphics engine 102 (MGE), a memory storage component 104, and a central process unit 106 (CPU) all operatively connected to a bus 108 and each of which is configured to be in communication with each other over the bus 108. The MGE 102 is configured to receive digital image data from a digital input 101 (i.e., digital camera component, digital camcorder component, etc.) and operate in conjunction with the CPU 106 to process the image data for storage in the memory storage component 104 for later rendering on a display 110. It should be understood that the term mobile graphics engine 102, as used herein, may refer to a graphics chip processor, graphics controller or display controller. Exemplary devices represented by host computing device 100 includes cell phones, personal digital assistants, web tablets, digital cameras, camcorders, personal computers, etc. It should be understood that the host computing device 100 may be any type of electronic device as long as the device includes a CPU 106, a MGE 102 and a memory component 104.

Continuing with FIG. 1, in one embodiment, the MGE 102 is configured to apply a JPEG compression algorithm to the digital image data during image processing to reduce the file size of the digital image data. In another embodiment, the digital image data is compressed using the JPEG 2000 or other equivalent digital data compression standard. It should be understood that the digital image data may be compressed using any data compression standard that involves tiling an image into discrete data bit sections followed by application of encoding operations to the data. In one embodiment, the MGE 102 is a size limiting logic to ensure that the compressed digital image data files do not exceed a maximum bit size limit set by the user.

Figure 2:
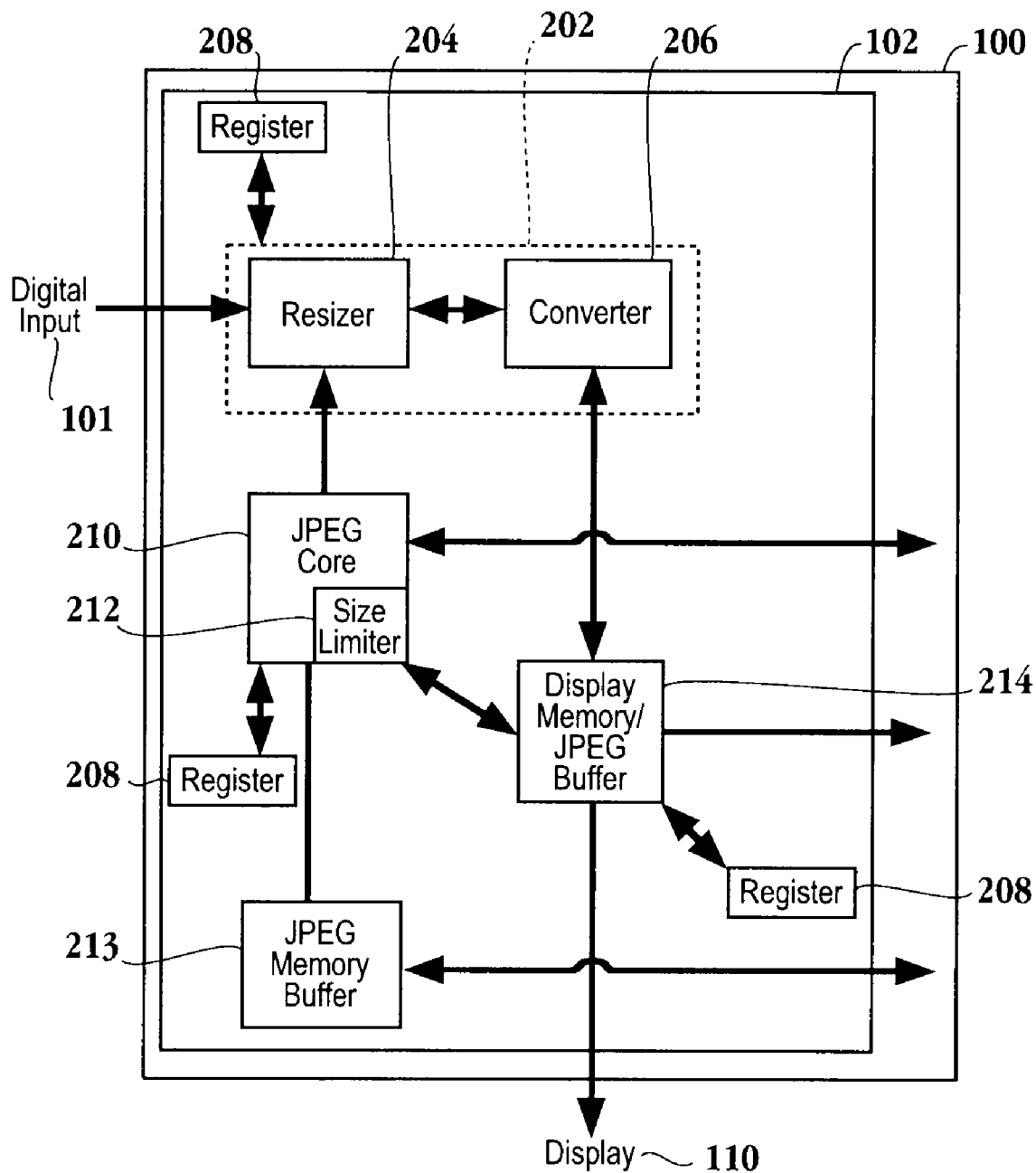
FIG. 2 is a more detailed schematic diagram illustrating the various functional components of the mobile graphics engine (MGE), in accordance with one embodiment of the present invention.

FIG. 2 is a more detailed schematic diagram illustrating the various functional components of the mobile graphics engine (MGE), in accordance with one embodiment of the present invention. In this embodiment, the MGE 102 includes a sub-sampling component 202 that is configured to be in data communications with a JPEG core component 210 and a display memory 214. Integrated within the sub-sampling component 202 are a resizer module 204 and a converter module 206. Incoming digital image data from the digital input 101 is received by the resizer module 204 which is configured to adjust a size associated with the incoming digital image data for eventual display on a display panel 110 that is in communication with the MGE 102. In one embodiment, the resizer module 204 is configured to adjust a crop factor and scale factor associated with the incoming digital image data. That is, by adjusting the crop factor and scale factor, the image is cropped and scaled, respectively, for output. In one embodiment, the sub-sampling component 202, JPEG core component 210 and the display memory 214 are configured to be operatively connected to a plurality of registers depicted as a register block 208. The register block 208 is depicted as a single block for illustrative purposes, however, it will be apparent to one skilled in the art that registers may be distributed throughout MGE 102.

In one embodiment, the resizer component 204 is configured to output the resized digital image data to either the JPEG core component 210 or the converter module 206 depending on the operational setting for the MGE 102. The image data is output to the JPEG core component 210 when the MGE 102 operational setting calls for the data to be tagged for compression and eventual long term storage (e.g., hard drive, JPEG memory buffer 213, etc.). The image data is output to the converter module 206 when the MGE 102 setting calls for the data to be rendered for preview display to a user. In one embodiment, the converter module 206 is configured to receive the resized digital image data from the resizer component 204, convert the data into a displayable format (e.g., RGB, etc.), and communicate the converted data to the display memory 214. It should be appreciated that the image data can be converted into any displayable format so long as the resulting converted image can be rendered on the display 110 that is operatively connected to the display memory 214. In one embodiment, the display memory 214 is configured to be in communications with the JPEG core component 210 and to allow image data processed by the converter module 206 to be sent to the JPEG core component 210 for compression and eventual permanent storage.

Continuing with FIG. 2, in one embodiment, the JPEG core component 210 is configured to be in data communications with data storage elements such as a JPEG memory buffer component 213, the host computing device 100, and the display memory 214. Depending on the MGE 102 configuration and the requirements of the application, the data output from the JPEG core component 210 can be routed to any one of the data storage elements named above. For example, in one embodiment, the compressed data files from the JPEG core 210 is routed to the JPEG memory buffer 213 which is in turn configured to be in communication with the host computing device 100. The JPEG memory buffer 213 serves as a temporary intermediate storage location to buffer the transfer of image data from the JPEG core component 210 to the host computing device 100 for eventual long term storage or other processing. In another embodiment, the compressed data files are sent directly from the JPEG core component 210 to the host computing device 100 for long term storage. This embodiment is used when the host computing device 100 has data storage hardware (e.g., flash memory, EEPROM, hard drives, optical drives, etc.) that can write data to memory at a rate that matches the data transfer rate from the JPEG core component 210. In still another embodiment, the compressed data files are sent to a display memory component 214 which is configured to serve a secondary data buffering role between the JPEG core component 210 and the host computing device 100.

In one embodiment, the JPEG core component 210 includes a size limiter module 212 that is configured to enforce a maximum bit size limit for the digital image data compressed by the JPEG core 210 while minimizing any adverse impacts to the quality of the resulting image. Examples of ways in which a maximum bit size limit can be set for the size limiter module 212 include changing the settings of the configuration menu of the host computing device 100 housing the MGE 102, changing the configuration settings of the device 100 using configuration software loaded onto a computing device operatively connected to the device 100 housing the MGE 102, or manipulating a physical component (e.g., dial, switch, slider, button etc.) of the device housing the MGE 102 that can translate the input into a size limit setting. It should be appreciated that the maximum bit size limit can be set using any method as long as the JPEG core component 210 can interpret and enforce the size limit setting.

Figure 3:
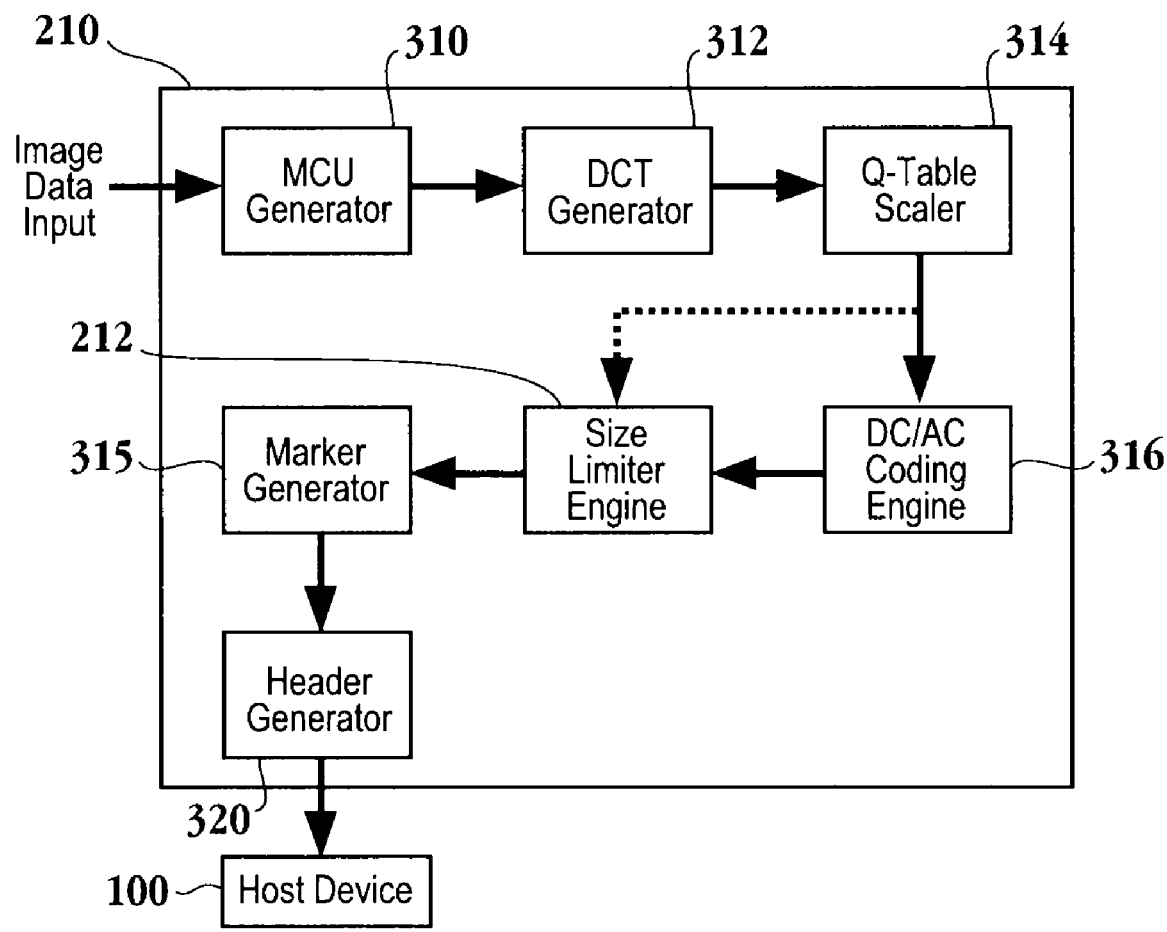
FIG. 3 is a detailed illustration of how the size limiter interacts with the other internal components of the JPEG core, in accordance with one embodiment of the present invention.

FIG. 3 is a detailed illustration of how the size limiter interacts with the other internal components of the JPEG core, in accordance with one embodiment of the present invention. In this embodiment, the JPEG core 210 includes a Minimum Coded Unit (MCU) Generator 310, a Discrete Cosine Transform (DCT) Generator 312, a Q-Table Scaler 314, a DC/AC Coding Engine 316, a Size Limiter Engine 212, a Marker Generator 318 and a Header Generator 320. As depicted all the JPEG core 210 components are configured to be operatively connected each another to allow for the bi-directional transfer of data between the components. The digital image data received by the JPEG core 210 is first routed through the MCU Generator 310, which operates to transform each YCbCr color channel component (i.e., Y-luminance, Cb-chrominance, Cr-chrominance) of the image into MCU blocks. In one embodiment, each MCU block is comprised of 8 lines by 8 rows of pixels. It should be appreciated however, that an MCU may be comprised of any number of lines and rows of pixels as long as the MCU Generator 310 can be configured to do so. Each MCU block is sent to the DCT Generator 312 where a discrete cosine transform operation is performed on each pixel of each MCU block. Typically, DCT will create a new set of MCU data with lower frequency data is positioned on the top left corner of each MCU block while higher frequency data is positioned on the bottom right hand corner.

The DCT transformed MCU blocks output from the DCT Generator 312 are then run through the Q-Table Scaler 314 which applies a scaling operation to each MCU block that will reduce the bit size of each pixel on a MCU block. This is done by simply dividing each pixel of the DCT transformed MCU block by a corresponding Q constant listed on a Q-Table and then rounding the resulting value to the nearest integer. The Q-Table is constructed using a Q value setting that is input by the user. In one embodiment, the Q value setting is an integer value that is input by the user. For example, the Q value can be set to any value from 1 (lowest image quality) to 99 (highest image quality). In another embodiment, the Q constant is associated with an image quality setting that is input by the user. For example, an image quality setting of low is associated with a Q value of 1 whereas an image quality setting of high is associated with a Q value of 99.

Continuing with FIG. 3, in one embodiment, the JPEG core 210 is configured to switch between a "relaxed 2-pass" mode and an "aggressive" mode setting depending on the requirements of the application or the user. The JPEG core 210 applies different system logic to the image data depending on the mode setting. In the "relaxed 2-pass" mode setting, the output image data from the Q-Table Scaler 314 is sent directly to the Size Limiter Engine 212 which is configured to identify a cut-off position in each MCU block where all the successive pixel data have values that are below a threshold value setting. In one embodiment, the Size Limiter Engine 212 is configured to insert a cut-off position indicator to identify the cut-off position of each MCU block when the MCU blocks are sent to the Size Limiter Engine 212 for processing. The indicator signals the suspension of monitoring of pixel data preceding the indicator for maximum bit size limit violations. Pixel data succeeding the position of the indicator are monitored for maximum bit size limit violations. In one embodiment, the Size Limiter Engine 212 is configured to automatically reconfigure the threshold value setting based on a difference in a number of bits between the accumulated monitored bit size of the pixel data preceding the threshold value and the maximum bit size limit. In another embodiment, that Size Limiter Engine 212 is configured to allow a user to manually reconfigure the threshold value setting.

In one embodiment, once the maximum bit size limit for a MCU block has been exceeded, the Size Limiter Engine 212 is configured to insert a code which prompts the DC/AC coding engine to assume all remaining data of the MCU block has a value of 0. With all the remaining data set to 0, the DC/AC Coding Engine 316 may compress the MCU to a minimum bit size. In one embodiment, the DC/AC Coding Engine 316 is configured to process and encode the pixel data in each MCU block in a "zigzag" order employing a run-length encoding (RLE) algorithm that groups pixel data representing similar frequencies together. It should be understood, that the DC/AC Coding Engine 316 can be configured to process the pixel data of each MCU block in any order as long as the JPEG core 210 can later decode the encoded MCU blocks and restore the image to a format that can be displayed.

Still with FIG. 3, in the "aggressive" mode setting, the output data from the Q-Table Scaler 314 is first sent to the DC/AC Coding Engine 316 which encodes each pixel of a MCU block prior to sending the encoded pixel to the Size Limiter Engine 212 to determine if the accumulated pixels exceed a maximum bit size limit for the MCU block. In one embodiment, once the maximum bit size limit for the MCU block is exceeded, the Size Limiter Engine 212 is configured to insert a code that prompts the DC/AC coding engine to assume all remaining data of the MCU is 0.

The data output from the Size Limiter Engine 212 is routed to the Marker Generator 318 and then the Header Generator 320 where a reset marker and decoding information is inserted into each MCU block to enable later decoding of each MCU block using a reverse operation. In one embodiment, the reset marker resets the DC coding function of the DC/AC Engine 316 by signaling the Size Limiter Engine 212 to stop taking a difference of the current MCU block DC value and a previous MCU block DC value. After processing by the Marker Generator 318 and Header Generator 320, the data is transferred to the display memory, host computing device or JPEG memory buffer for storage prior to display or retrieval.

Figure 4:
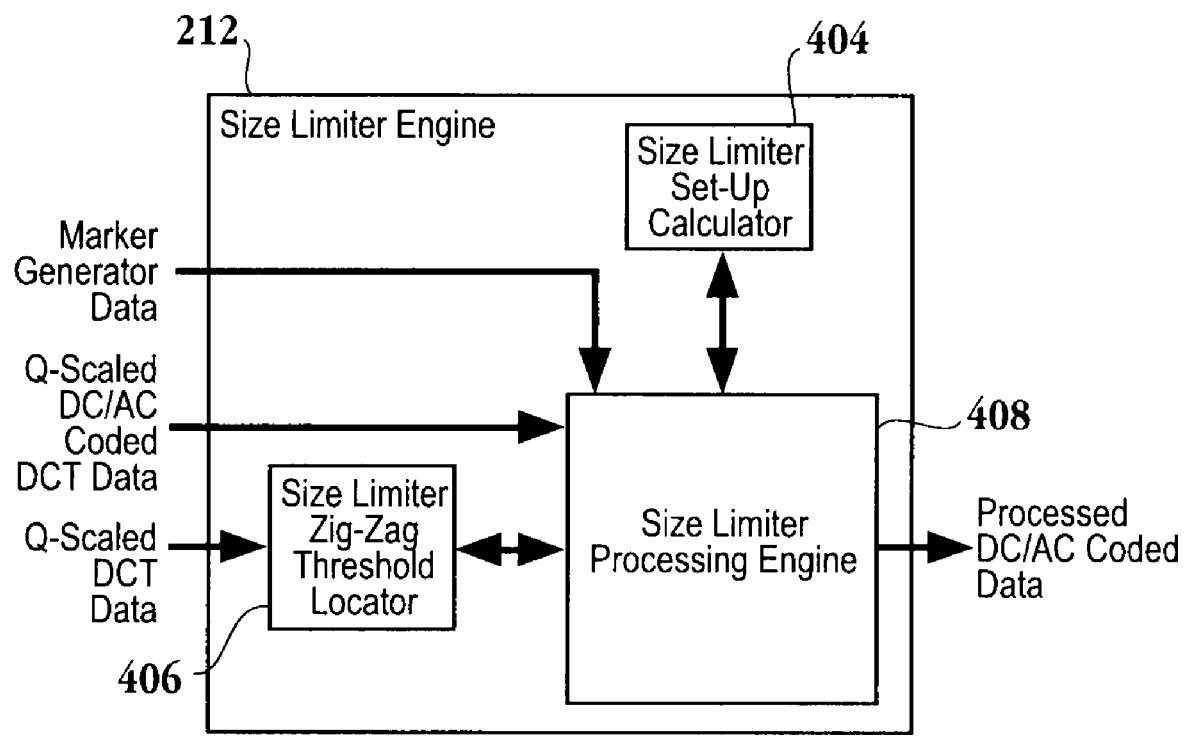
FIG. 4 is a detailed illustration of the primary blocks of the size limiter engine, in accordance with one exemplary embodiment of the present invention.

FIG. 4 is a detailed illustration of the primary blocks of the size limiter engine, in accordance with one exemplary embodiment of the present invention. In this exemplary embodiment, the Size Limiter Engine 212 includes a size limiter wrapper 402, a size limiter set-up calculator 404, a size limiter zig-zag threshold locator 406, and a size limiter processing engine 408. The size limiter processing engine 408 is configured to be in data communications with the size limiter set-up calculator 404 and the size limiter zig-zag threshold locator 406. It should be appreciated that the functionalities of the various internal elements of the Size Limiter Engine 212 may be set apart from or integrated with the other functional elements of the Size Limiter Engine 212 depending on the requirements of the particular device application. For example, the functionality of the size limiter zig-zag threshold locator 406 may be set apart, as depicted herein FIG. 4, or integrated with the size limiter processing engine 408 or size limiter set-up calculator 404.

In one embodiment, the size limiter zig-zag threshold locator 406 is configured to receive digital image data from the Q-Table Scaler of the JPEG core after the data has been processed using a discrete cosine transform and Q-scaling operation as described previously. The threshold locator 406 examines each MCU block of the image data to determine a cut-off position in each MCU block where all the remaining successive pixels have values that are below the threshold value and inserts an indicator identifying the position before sending the MCU block to the size limiter processing engine 408 for processing. In one embodiment, the size limiter zig-zag threshold locator 406 is configured to forward the cut-off position for each MCU block to the size limiter processing engine 408 prior to the processing of each MCU block.

Still with FIG. 4, in one embodiment the size limiter set-up calculator 404 is configured to calculate a maximum bit size limit for all the MCU blocks of a JPEG file based on a maximum file size setting for the JPEG file and the number of MCU blocks that comprise the JPEG file. In another embodiment, the maximum bit size limit for the MCU blocks is determined based on an image quality setting for the JPEG file. A lower image quality setting results in a lower MCU block maximum bit size limit whereas a higher image quality setting results in a higher MCU block maximum bit size limit. After the maximum bit size limit has been determined by the size limiter set-up calculator 404, the bit size limit is forwarded to the size limiter processing engine 408 which processes pixel data from each MCU block to determine if the bit size limit has been exceeded (i.e., violated).

In one embodiment the size limiter processing engine 408 is configured to receive MCU blocks representing the digital image data from the DC/AC Engine of the JPEG core and the size limiter threshold locator 406. The size limiter processing engine 408 applies system logic to each MCU block to enforce a maximum bit size limit for the digital image data while minimizing adverse effects to the quality of the image. As discussed previously, the type of system logic applied depends on whether the size limiter processing engine (i.e., JPEG core) 408 is operating under a "relaxed 2-pass" mode or an "aggressive" mode setting. If the size limiter processing engine 408 is operating under a relaxed 2-pass mode setting, a threshold value will first be applied against the pixel data to locate a cut-off position on the MCU block. The maximum bit size limit is monitored only for the pixels succeeding in position to the cut-off position. If the size limiter processing engine 408 is operating in an aggressive mode setting, the maximum bit size limit is monitored for all the pixel data of the MCU block.

Figure 5:
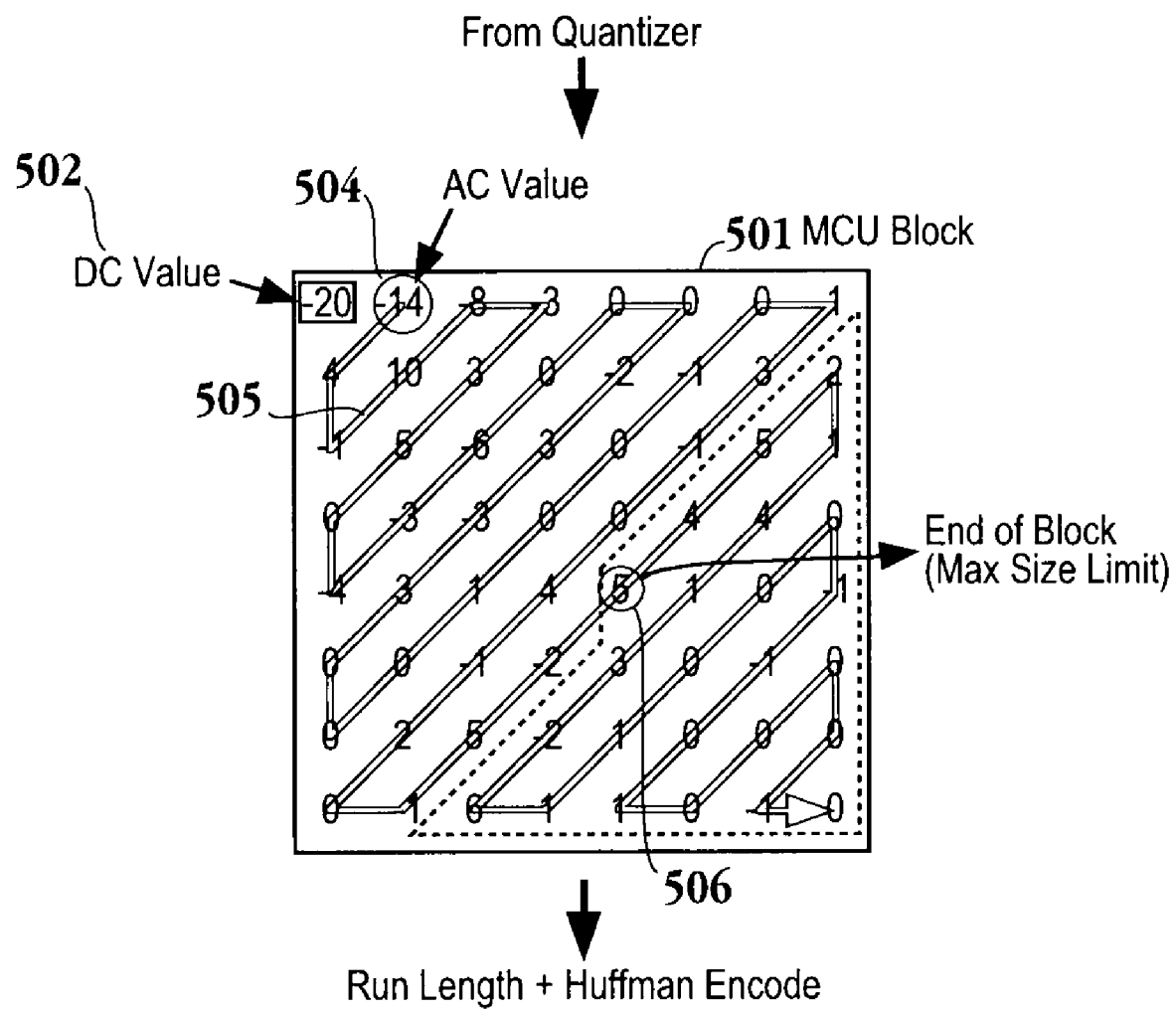
FIG. 5 is a detailed illustration of how the size limiter processing engine applies system logic to a MCU block while in an aggressive mode setting, in accordance with one embodiment of the present invention.

FIG. 5 is a detailed illustration of how the size limiter processing engine applies system logic to a MCU block while in an aggressive mode setting, in accordance with one embodiment of the present invention. In this embodiment, an MCU block 501 is depicted as a matrix comprised of 8 columns and 8 rows of pixel data. Each number in the MCU block 501 is a data pixel that encodes a portion of the digital image data representing an image. As alluded to earlier, lower frequency data is positioned on the top left corner of each Minimum Coded Unit (MCU) block 501 while higher frequency data is positioned on the bottom right hand corner. The pixel on the upper left corner of the MCU block 501 represents a DC coefficient (i.e., −20) 502 while all the other pixels in the MCU block 501 represents AC coefficients. The size limiter processing engine monitors the bit sizes of each pixel of the MCU block 501 in the same zig-zag pattern 505 that the pixels are encoded by the DC/AC Engine. As depicted, herein, the zig-zag pattern illustrated by line 505 is superimposed onto the pixel data of the MCU block 501. The size limiter processing engine processes the pixel data in a defined order starting from the top left corner of the MCU block 501 proceeding to the bottom right corner of the MCU block 501. For example, after the DC value (i.e., −20) 502 is encoded, the size limiter processing engine processes the next pixel representing an AC value (i.e., −14) 504 positioned to the right of the DC value 502. After the size limiter processing engine determines that the accumulated bit size of that pixel does not exceed the maximum bit size limit for the MCU block 501, the size limiter processing engine proceeds following the zig-zag pattern 505 to the next pixel (i.e., 4) that is one position to below and to the left of the previous pixel (i.e., −14).

Continuing with FIG. 5, during aggressive mode monitoring, the bit size of each successive pixel is accumulated with the bit sizes of the previously monitored pixels to come to an accumulated bit size value for the monitored pixels. As long as the accumulated bit size value for the monitored pixels do not exceed a maximum bit size value limit set for the MCU block 501, the size limiter processing engine is configured to continue to allow the DC/AC Engine to encode the pixels. In one embodiment, once the accumulated bit size value for the monitored pixels exceed the maximum bit size value limit for the MCU block 501, end of block (EOB) data 506 is inserted into that pixel position which designates all other zig-zag data after that position as having a value of 0. The decoder will decode this MCU block only up the EOB data position on the MCU.

Figure 6:
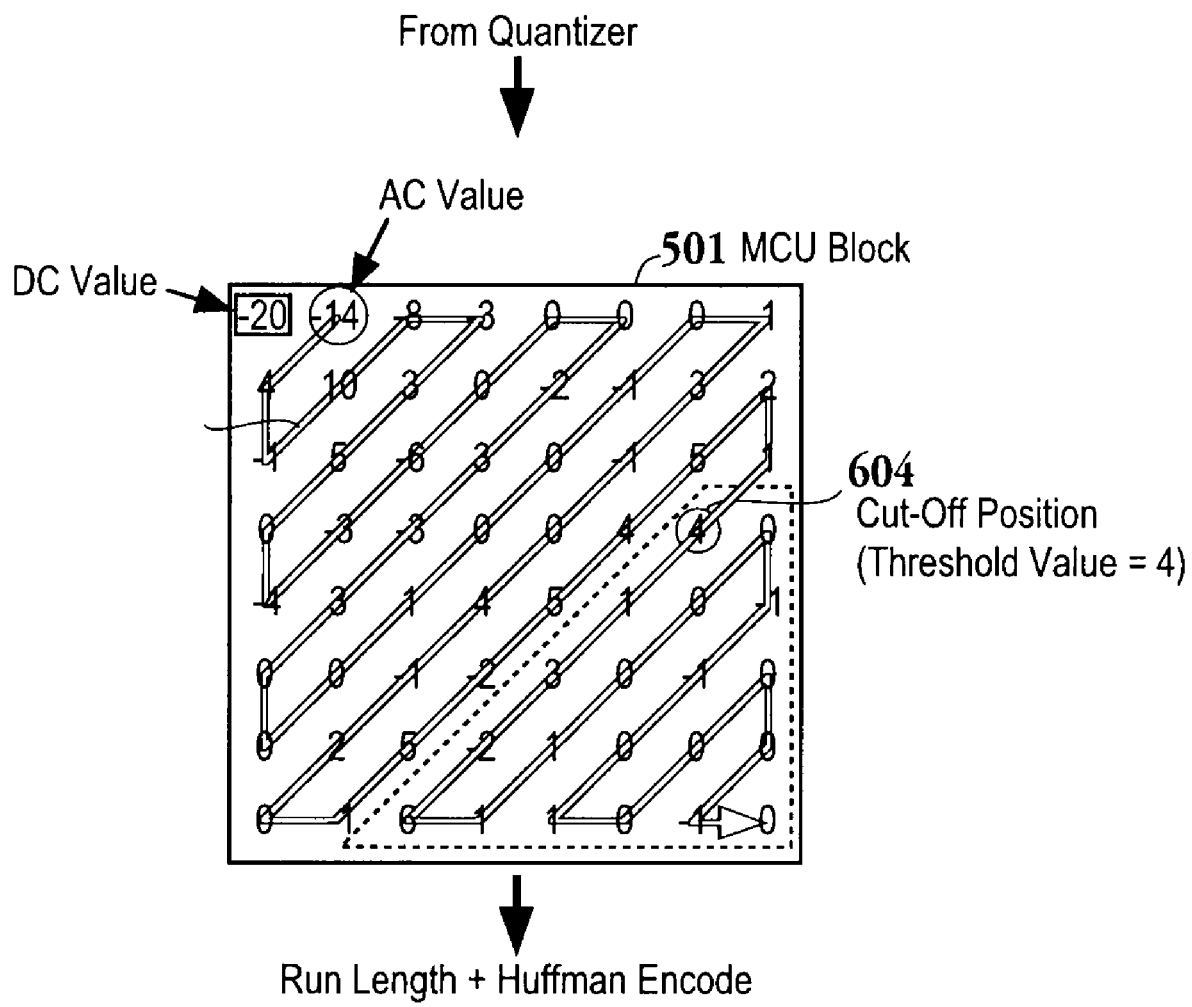
FIG. 6 is a detailed illustration of how the size limiter processing engine applies system logic to a Minimum Coded Unit (MCU) block while in a relaxed 2-pass mode setting, in accordance with one embodiment of the present invention.

FIG. 6 is a detailed illustration of how the size limiter processing engine applies system logic to a MCU block while in a relaxed 2-pass mode setting, in accordance with one embodiment of the present invention. In this embodiment, the size limiter processing engine is configured to locate the cut-off position 604 on each MCU block 501 by scanning for the cut-off position 604 indicator previously inserted by the size limiter zig-zag threshold locator. The size limiter processing engine is configured to suspend monitoring the bit size value of all pixel data preceding the cut-off position 604 and only monitor the accumulated bit size values for pixel data succeeding the cut-off position 604.

In one embodiment, once the accumulated bit size value for the monitored pixels exceeds the maximum bit size value limit for an MCU block 501, end of block (EOB) data 506 is inserted into that pixel position which designates all other zig-zag data after that position as having a value of 0. The decoder will decode this MCU block only up to the EOB position on the MCU.

Figure 7:
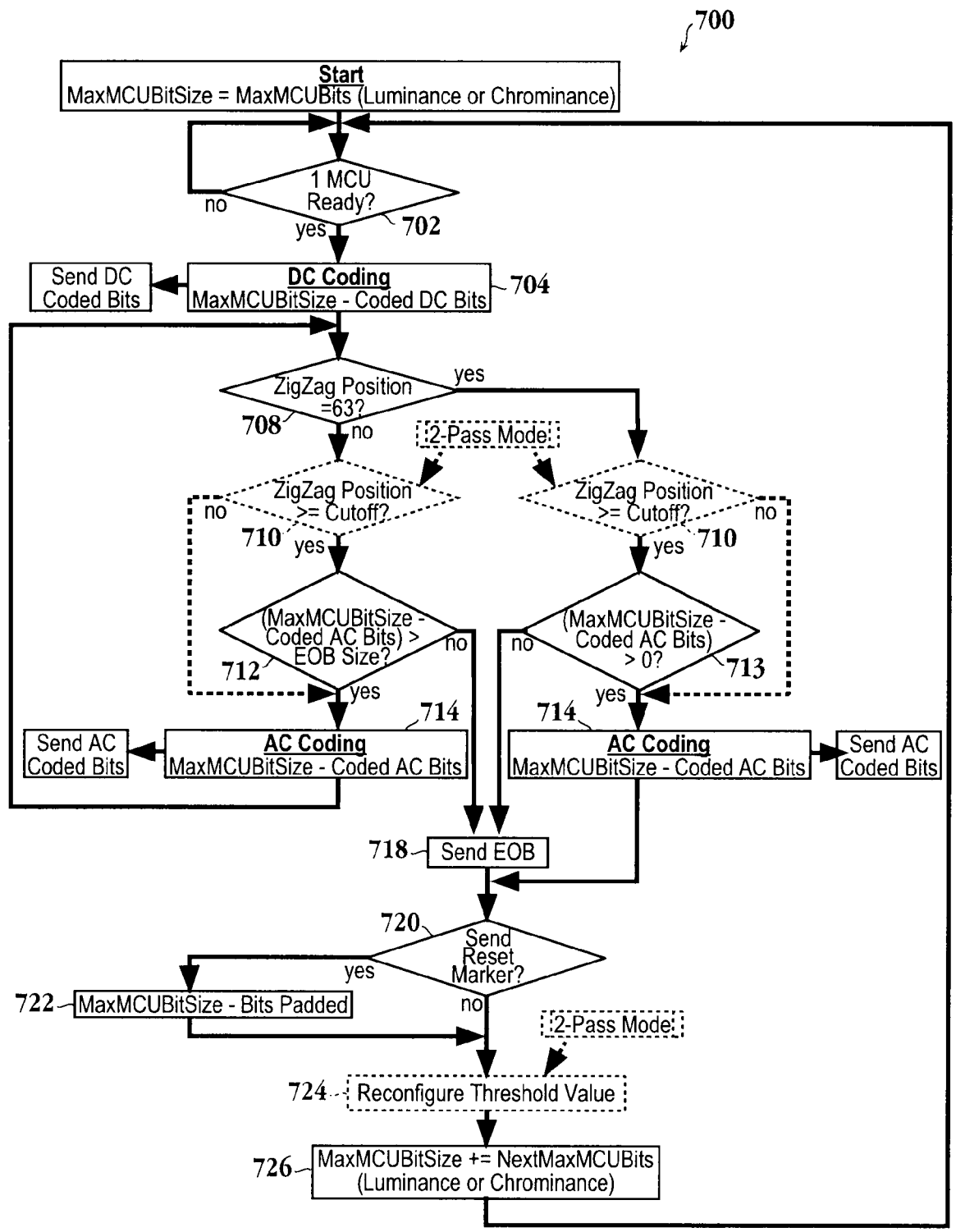
FIG. 7 shows a flow chart detailing how the size limiter processing engine executes the aggressive mode and relaxed 2-pass mode settings, in accordance with one embodiment of the present invention.

FIG. 7 shows a flow chart detailing how the size limiter processing engine executes the aggressive mode and relaxed 2-pass mode settings, in accordance with one embodiment of the present invention. Diagrams of the microprocessor and size limiter engine module utilized in this method are shown in FIGS. 2, 3 and 4. Method 700 begins with operation 702 where the size limiter engine is configured to inquire if the MCU block is ready for processing and loops that inquiry until the MCU block is ready. Next the method 700 proceeds to operation 704 where the DC value of the MCU block is encoded by the DC/AC Engine. The size limiter processing engine will take the maximum bit size limit value for the MCU block and subtract a quantity of memory bits from the maximum bit size limit value that is equal to the amount of memory bit space taken up by the encoded DC value to arrive at a remaining maximum bit size limit value. The method moves on to operation 708 where an inquiry is made as to whether the AC value being encoded is in the 63$^{rd}$ or last zig-zag pattern pixel position on the MCU block.

If the pixel is not in the 63$^{rd}$ pixel position, the method moves on to either operation 710 or operation 712 depending on whether the size limiter processing engine is operating in an relaxed 2-pass mode or aggressive mode setting. In a relaxed 2-pass mode setting the method moves on to operation 710. In an aggressive mode setting, the method bypasses operation 710 and moves directly on to operation 712. In operation 710, the size limiter engine inquires whether the position of the pixel being encoded is preceding the cut-off position, located in the manner described above using a threshold value setting. If the pixel position does precede the cut-off position, the method moves directly on to operation 714 where the pixel is encoded. If the pixel position comes after the cut-off position, the method moves on to operation 712. During operation 712, the size limiter processing engine checks to see if the remaining maximum bit size limit value is greater than the amount of bits necessary to insert an end of block instruction. If the remaining maximum bit size limit value is greater than the amount of bits necessary to insert an end of block instruction, the method moves on to operation 718. If the remaining maximum bit size limit value is less than the amount of bits necessary to insert an end of block instruction, the method moves on to operation 714 where the AC value is encoded and the method moves back up to operation 708 for the remaining pixel data in the MCU block.

Still with FIG. 7, if the pixel is in the 63$^{rd}$ pixel position, the method moves on to either operation 710 or operation 713 depending on whether the size limiter processing engine is operating in an relaxed 2-pass mode or aggressive mode setting. In a relaxed 2-pass mode setting, the method moves to operation 710 which is the same as that described above. After operation 710, the method moves to operation 713 where the size limiter processing engine checks to see if the remaining maximum bit size limit value is greater than zero. If the remaining maximum bit size limit value is greater than zero, the method moves on to operation 714 where the pixel value is encoded and then proceeds to operation 702 for the next MCU block. If the remaining maximum bit size limit value is less than zero, the method moves on to operation 718. In an aggressive mode setting, the method moves directly from operation 708 to operation 713.

During operation 718, end of block data is inserted into the MCU block. In one embodiment, the end of block data prompts the DC/AC Engine to assign values of 0 to the remaining successive pixels of the MCU block. Next, the method proceeds to operation 720, where the size limiter processing engine checks to see whether a reset marker needs to be sent. If a reset marker needs to be sent, the method proceeds to operation 722 where the data for the reset marker is inserted to the MCU block and the dummy bits are padded to the MCU block to bring the size of the reset marker to the nearest byte. If a reset marker does not need to be sent, the method moves on to either operation 724 or operation 726 depending on whether the size limiter processing engine is operating under a relaxed 2-pass mode or aggressive mode setting. In a relaxed 2-pass mode setting, the method moves to operation 724 where the size limiter processing engine is configured to automatically reconfigure the threshold value setting based on the bit size of the remaining maximum bit size limit value after all the pixel data in the MCU block has been encoded. After, the method moves on to operation 726 where a new maximum bit size limit value is set for the next MCU block to be encoded based on the bit size of the remaining maximum bit size limit value after all the pixel data in the MCU block is encoded. In an aggressive mode setting, the method moves to operation 726 directly from operation 720 or operation 722.

It should be appreciated that although the flowchart in FIG. 7 shows that the bit size of each encoded pixel of an MCU block is subtracted from the maximum bit size limit value during processing and this is but one example of how the size limiter processing engine can function. In another embodiment, the size limiter processing engine can be configured to accumulate the successive bit sizes of the encoded pixels as the size limiter processing engine processes each pixel in the MCU block. The accumulated bit size of the processed pixels is then compared against a maximum bit size limit value for the MCU block to see if the maximum value has been exceeded.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus such as a microprocessor or an equivalent to perform the required operations.

The above-described invention may be practiced with other computer system configurations including hand-held devices, microprocessor systems, microprocessor-based or programmable consumer electronics, minicomputers, mainframe computers and the like.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to he details provided therein, but may be modified and practiced within the scope of the appended claims.

What is claimed is:

1. A method for limiting a file size of an encoded file, comprising:

a processor carrying out the following steps:

(a) dividing said encoded file into a plurality of data blocks of predefined bit-sizes;

(b) receiving a data set from the encoded file, said data set defining a given data block;

(c) for said data set, setting a maximum bit size limit for data in the data set, said maximum bit size limit being smaller than the predefined bit-size of the given data block;

(d) accumulating successive bit data sizes corresponding to each data unit of the data set according to an order;

(e) detecting the data unit according to said order at which the accumulated successive bit sizes of the data set exceeds said maximum bit size limit;
(f) noting the location of said detected data unit to demarcate a portion of the data set that exceeds the maximum bit size limit;
(g) inserting end of block data at a data unit selected from said noted location of said detected data unit through the demarcated portion of the data set that exceeds the maximum bit size limit; and
(h) assigning a new value to all data units that follow the end of block data within said data set.

2. The method for limiting a file size of an encoded file, as recited in claim 1, further including:
setting a threshold value;
identifying a location on the data set where all remaining successive data units within the data set are below the threshold value; and
inserting a cut-off position indicator to the location to signal suspending the maximum bit size limit for the accumulated monitored bit size of all data units preceding the threshold value.

3. The method for limiting a file size of an encoded file, as recited in claim 1, wherein in step (g) said end of block data is inserted at said noted location of said detected data unit.

4. The method for limiting a file size of an encoded file, as recited in claim 2, further including:
adapting an updated threshold value according to a difference in a number of bits between the accumulated monitored bit size of all data units preceding the threshold value and the maximum bit size limit.

5. The method for limiting a file size of an encoded file, as recited in claim 1, further including:
adding data bits that define a marker to the data set.

6. The method for limiting a file size of an encoded file, as recited in claim 5, further including:
packing dummy bits to bring the marker bit size to a nearest byte.

7. The method for limiting a file size of an encoded file, as recited in claim 1, further including:
for each successive data unit, comparing the currently accumulated monitored bit size against the maximum bit size limit to determine if the data set has reached the accumulated monitored bit size that exceeds the maximum bit size limit.

8. A computer-readable medium embodying a mobile graphics engine (MGE) configured to limit a file size of an encoded file comprised of a plurality of data set blocks, comprising:
a sub-sampling component including a resizer module and a converter module, wherein the resizer module is configured to be in communications with a digital input and the converter module, wherein the converter module is in communications with a display memory; and
a core component configured to be in communication with the resizer module, the display memory component, a file memory buffer component, and a host computing device, wherein, the core component includes a size limiter module, the size limiter module being configured to limit the file size of the encoded file based on a bit-limit value applied to each data set block of the encoded file.

9. The MGE of claim 8, wherein the bit-limit value is a maximum bit size limit for each data set block of the encoded file.

10. The MGE of claim 9, wherein the size limiter component is configured to utilize the maximum bit size limit to assign a predefined value to each successive data unit of the data set that exceeds the maximum bit size limit for the data unit set.

11. The MGE of claim 10, wherein the value is zero.

12. The MGE of claim 8, wherein the bit-limit value is a threshold limit value applied to each data set block of the encoded file.

13. The MGE of claim 12, wherein the size limiter component is configured to utilize the threshold limit value to locate a cut-off position within the data set, whereby data units preceding the cut-off position are not subject to a maximum bit size limit.

14. The MGE of claim 8, wherein the resizer component is configured to apply a scaling factor to each data unit of the encoded file.

15. The MGE of claim 8, further including:
a register configured to be accessed by the host computing device, the display memory component, the sub-sampling component and the core component, wherein, the display memory component is further configured to be accessed by the host, the core component, the converter module, and an output display.

16. A computer-readable medium embodying a size limiter module configured to limit a file size of a file, said file being comprised of a plurality of data set blocks, said size limiter module comprising:
a size limiter set-up calculator configured to identify a target maximum bit size for each data set block to be encoded based on a maximum value for the file size of the file, the current bit size of each data set block to be encoded being greater than its target maximum bit size; and
a size limiter processing engine configured to be in communication with the size limiter set-up calculator, to process each data set block to be encoded, and monitor a cumulative bit size for each data set block according to an order during its encoding, wherein, when the cumulative bit size of a data set block during its encoding is greater than its corresponding target maximum bit size, the size limiter processing engine inserts end of block data into the encoded data set block, the end of block data being a signal to substitute a null value for all data units in the data set block subsequent to the end of block data.

17. The size limiter module of claim 16, further including a size limiter threshold locator configured to be in communications with the size limiter processing engine, to receive the data set block to be encoded, and to identify a cut-off position within the data set block based on a threshold value, wherein, the cut-off position is a data unit location within the data set block to be encoded where all remaining successive data units within the data set block are one of less than or equal to the threshold value.

18. The size limiter module of claim 17, wherein, the size limiter threshold locator is configured to communicate the cut-off position to the size limiter processing engine.

19. The size limiter module of claim 17, wherein the cut-off position signals the size limiter engine to suspend monitoring the cumulative bit size and the maximum bit size for all data units preceding the cut-off position.

20. The size limiter module of claim 16, wherein the size limiter module is incorporated into a display controller.

21. The method for limiting a file size of an encoded file, as recited in claim 1, further including:
- setting a threshold value;
- before step (g), identifying within the demarcated portion of the data set that exceeds the maximum bit size limit, a location where all remaining successive data units according to said order within the data set are below the threshold value; and
- in step (g), inserting the end of block data at said location where all remaining successive data units are below the threshold value.

* * * * *